April 20, 1965    HANS-PETER SCHABERT ETAL    3,179,571
NUCLEAR FUEL UNITS WITH ENCLOSURES OF THE THIMBLE TYPE
FOR PRESSURE-TUBE NUCLEAR REACTORS
Filed Oct. 31, 1961

United States Patent Office 3,179,571
Patented Apr. 20, 1965

3,179,571
NUCLEAR FUEL UNITS WITH ENCLOSURES OF THE THIMBLE TYPE FOR PRESSURE-TUBE NUCLEAR REACTORS
Hans-Peter Schabert and Horst Michael, both of Erlangen, Germany, assignors to Siemens-Schuckertwerke Aktiengesellschaft, Berlin-Siemensstadt, Germany, a corporation of Germany
Filed Oct. 31, 1961, Ser. No. 148,891
Claims priority, application Germany, Nov. 3, 1960, S 71,117
2 Claims. (Cl. 176—68)

Our invention relates to enclosed nuclear fuel units for pressure-tube nuclear reactors and, more particularly, to fuel units with enclosures of the thimble type comprising an outer tube closed at the bottom and a coaxial inner tube.

Fuel units of this type, particularly in heavy-water moderated pressure-tube reactors, result in a relatively simple design of the reactor assembly. In the known thimble-type fuel units, the nuclear fuel rods are inserted in the inner tube, and the coolant flows downwardly through the annular space between the outer pressure tube and the inner tube, then reverses its direction at the bottom of the unit, and passes upwardly through the inner tube between the individual fuel rods.

Relating generally to thimble-type tubular fuel for nuclear reactors, it is an object of our invention to afford increasing the number of fuel elements or rods per fuel unit, thus increasing the efficiency and reducing the heat losses for a given volume or size of the tubular enclosure. Another object of the invention is to improve the output energy or yield by reducing the self-shielding effect of the thimble-tube structure.

To achieve these objects, as well as the further advantages mentioned hereinafter, and in accordance with a feature of our invention, we position the nuclear fuel rods or other fissionable elements in the annular space between the outer pressure tube and the inner tube of the thimble-type enclosure structure. According to another feature of the invention, we preferably supply the coolant centrally through the inner tube and discharge it through the annular space. As a result, an only slight pressure loss is involved. Since no fissionable rods are located in the inner tube, the self-shielding effect of the enclosure is likewise slight. The relatively large annular space around the inner tube within the outer pressure tube permits increasing the number of individual fuel rods or particles per fuel unit so that, for a given amount of fissionable substance, a considerable reduction in structural material and hence a reduction in heat losses is achieved. When using heavy water as coolant, it acts additionally as moderator in the interior of the fuel unit.

According to still another feature of our invention, the nuclear fuel of each element is composed of fuel rods having different diameters so as to obtain a favorable degree of occupancy in the annular space as well as a uniform distribution of the coolant between the outer and inner tubes.

An embodiment of a thimble-type nuclear fuel unit according to the invention is illustrated by way of example on the accompanying drawing in which.

Figure 1:
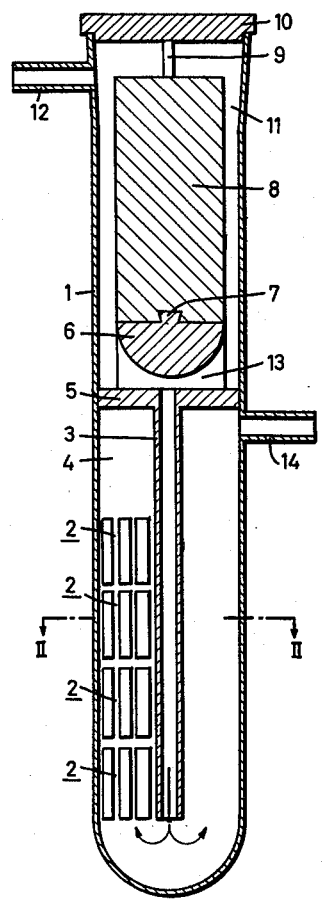
FIG. 1 shows schematically a vertical, axial section.

The illustrated fuel unit comprises a relatively thick-walled outer pressure tube 1 of the thimble type. That is, this tube is closed at the bottom. Disposed in the lower portion of the pressure tube 1 is a column of nuclear fuel composed, for example, of four groups 2 of fuel rods. The fuel-rod column is centrally traversed by an inner tube 3 which extends in coaxial relation to the pressure tube 1 and forms together therewith a vertically elongated annular space 4 in which the fuel column is located. The inner tube 3 terminates some distance above the bottom of the outer tube 1. The upper end of the inner tube 3 is joined with a transverse flange 5 above the fuel column. The flange forms a seal together with the cylindrical wall of the outer tube 1 and carries on its top a cylindrical projection 6 whose top surface is separably joined with a radiation shielding plug 8 by means of a swallow-tail engagement 7.

The outer pressure tube 1 and the inner tube 3 consist, for example, of a zirconium alloy. The shielding plug 8 and the flange 5 are preferably made of steel.

The upper end of the outer tube 1 is closed by a removable cover 10 which is connected with the shielding plug 8, for example by a connecting shaft or bolt 9 as illustrated. The diameter of the shielding plug 8 is smaller than the inner diameter of the pressure tube 1 so that an annular gap 11 remains between tube 1 and plug 8. A coolant supply pipe or duct means 12 joins the pressure tube 1 below the cover 10. The incoming coolant, for example $D_2O$, passes through the annular gap 11, thence through one or more channels 13 to a center bore of the flange 5 and into the inner tube 3. After leaving the lower end of the inner tube, the coolant reverses its direction and passes upwardly through the annular interspace 4 and between the fuel rods to a coolant outlet pipe 14 joined with the pressure tube 1 above the fuel column but below the flange 5.

Figure 2:
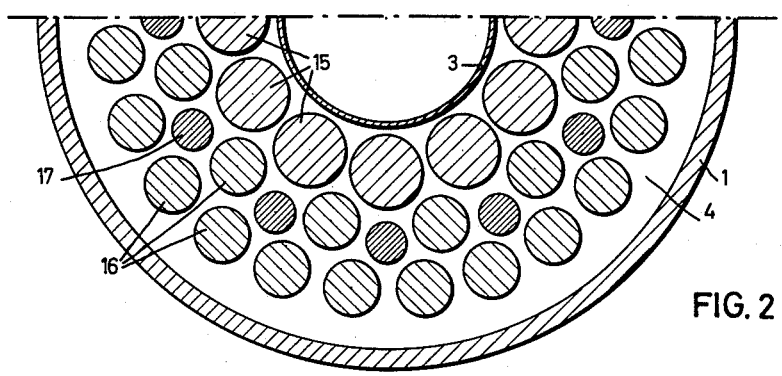
FIG. 2 is part of a cross section along the line II—II in FIG. 1.

The cross section of the pressure unit shown in FIG. 2 on a larger scale exemplifies a favorable distribution of the fuel rods in the annular interspace 4. Each annular group 2 of fuel element consists, for example, of sixty rods which concentrically surround the inner tube 3 in three rows, only a few rods being shown for simplicity. The inner row is formed by fuel rods 15 of relatively large diameter. The outermost row consists of fuel rods 16 of a somewhat smaller diameter. The middle row is composed alternately of fuel rods having the same diameter as those in the outermost row and of fuel rods 17 of a still smaller diameter. By virtue of the graduation in diameter of the fuel rods, a substantially uniform distribution of the fuel rods over the cross section of the annular space and thereby also a uniform distribution of the coolant is obtained. Due to the fact that the rods in the outermost zone, being exposed to a high neutron flux, have a smaller diameter than the rods in the inner zone, an excessive exposure of the outer rods to heat generation is prevented.

If the fuel elements are to be exchangd during operation of the nuclear reactor, it is preferable to give the portion of the pressure tube that protrudes out of the reactor core a length at least as large as the length of the column of fuel elements, the protruding length being approximately that of the tube portion located above the fuel column. Then the fuel elements are reliably cooled while they are being pulled out of the pressure tube without subjecting the hoisting means or, for example, a fuel charging or loading machine, to excessively hot coolant. The subsequent cooling of those parts of the fuel-element column which, while being pulled out, are already located above the outlet opening 14, is effected by a downwardly directed partial current of coolant which results from the fact that the piston-like flange 5 no longer provides a complete seal in the upper portion of the pressure tube 1 which is slightly conical so as to widen in the upward direction.

We claim:

1. A nuclear fuel unit for pressure-tube reactors, comprising an outer tube closed at the bottom, an inner tube extending from a location spaced from the bottom of said outer tube upwardly in coaxial relation to said outer tube and forming together therewith an annular space in the lower portion of said outer tube, said outer tube having an upper portion extending upwardly of said inner tube, a plurality of parallel columns of nuclear fuel elements located in said annular space around said inner tube, said fuel elements being spaced from each other and radially spaced from said inner tube to form passages for coolant, the fuel elements in a respective one of said columns radially closest to said inner tube having diameters larger than those of the fuel elements located at a further radial spacing from said inner tube, said upper portion of said outer tube being at least as long as the axial length of said columns, said inner tube having a flange at its upper end extending across said outer tube and forming a partition above said columns of fuel elements and sealing said annular space from said upper portion of said outer tube, a cylindrical shielding plug located in said upper portion above said flange, said plug being of a smaller diameter than said outer tube and forming an annular gap above said flange together with said outer tube, coolant supply means arranged near the top of said outer tube and communicating with said inner tube through said annular gap, and coolant outlet means located below said flange and communicating with said annular space above said columns.

2. A nuclear fuel unit according to claim 1, including a cover closing the top of said outer tube, said cover having connecting means joining said cover to said shielding plug and defining an annular interspace around said connecting means and between said cover and said plug, said plug having at its lower end an extension joined thereto and defining a channel for flow of coolant from said annular gap to said inner tube, said upper portion of said outer tube having a slightly tapering shape widening upwardly and outwardly toward the top end of said outer tube; and said cover, said plug, said extension, said flange and said inner tube being joined so that they can be withdrawn upwardly and removed together from said outer tube.

References Cited by the Examiner
UNITED STATES PATENTS

| | | | |
|---|---|---|---|
| 2,947,678 | 8/60 | Gimera et al. | 176—75 |
| 2,977,297 | 3/61 | Evans et al. | 176—81 |
| 3,000,728 | 9/61 | Long et al. | 176—61 |
| 3,026,256 | 3/62 | Liljeblad et al. | 176—63 |
| 3,070,537 | 12/62 | Treshow | 176—83 |
| 3,071,527 | 1/63 | Young | 176—83 |
| 3,128,234 | 4/64 | Cage et al. | 176—64 |

FOREIGN PATENTS

| | | |
|---|---|---|
| 604,829 | 9/60 | Canada. |
| 1,141,064 | 3/57 | France. |
| 1,252,674 | 12/60 | France. |
| 601,512 | 2/60 | Italy. |

CARL D. QUARFORTH, *Primary Examiner.*

OSCAR R. VERTIZ, *Examiner.*